United States Patent
Zhang et al.

(10) Patent No.: US 8,699,885 B2
(45) Date of Patent: Apr. 15, 2014

(54) POWER CONTROL IN AN OPTICAL NETWORK UNIT

(75) Inventors: Dongsheng Zhang, Fremont, CA (US); Eugene W. Lee, San Jose, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 3 days.

(21) Appl. No.: 13/106,768

(22) Filed: May 12, 2011

(65) Prior Publication Data

US 2012/0288279 A1    Nov. 15, 2012

(51) Int. Cl.
  *H04J 14/08*    (2006.01)
  *H04B 10/08*    (2011.01)
  *H04B 17/00*    (2006.01)
  *H04B 10/00*    (2013.01)

(52) U.S. Cl.
  USPC .............................. 398/98; 398/38; 398/153

(58) Field of Classification Search
  USPC ..................................... 398/52, 153
  See application file for complete search history.

(56) References Cited

U.S. PATENT DOCUMENTS

| | | | |
|---|---|---|---|
| 2004/0086277 A1* | 5/2004 | Kenny | .............................. 398/69 |
| 2004/0109688 A1 | 6/2004 | Kim et al. | |
| 2006/0093356 A1 | 5/2006 | Vereen et al. | |
| 2006/0268759 A1 | 11/2006 | Emery et al. | |
| 2007/0133596 A1* | 6/2007 | Kim | .............................. 370/465 |
| 2007/0230958 A1 | 10/2007 | Jiang et al. | |
| 2009/0110403 A1 | 4/2009 | Kramer | |

(Continued)

OTHER PUBLICATIONS

Wuhan Telecommunication Devices Co., Ltd., "GE-PON ONU Optical Transceiver SFF Module", WTD Co., Ltd., RTXM169E-F(V1.0), Edition Dec. 2, 2004 (V.1.0), 5 pages.

(Continued)

*Primary Examiner* — Shi K Li
*Assistant Examiner* — Casey Kretzer
(74) *Attorney, Agent, or Firm* — Amin, Turocy & Watson, LLP

(57) ABSTRACT

There are disclosed techniques for power control in an Optical Network Unit (ONU) of a Passive Optical Network (PON). In one embodiment, the supply of power to an optical transmitter is controlled in accordance with information defining a plurality of transmission windows during which data can be transmitted from the ONU, in order to achieve the following: (1) to provide power to the optical transmitter beginning at a predetermined time in advance of a transmission window to ensure a laser in the optical transmitter is ready to begin transmitting the data at the start of the transmission window; and (2) to refrain from providing full power to the optical transmitter between transmission windows when the duration of time between the transmission windows is greater than a predetermined length.

27 Claims, 12 Drawing Sheets

(56) References Cited

U.S. PATENT DOCUMENTS

| | | | |
|---|---|---|---|
| 2010/0054759 A1* | 3/2010 | Oda et al. | 398/202 |
| 2010/0111523 A1* | 5/2010 | Hirth et al. | 398/25 |
| 2010/0239252 A1* | 9/2010 | Davis et al. | 398/58 |
| 2010/0254706 A1* | 10/2010 | Hirth et al. | 398/48 |
| 2011/0123193 A1 | 5/2011 | Yamanaka et al. | |
| 2011/0211837 A1* | 9/2011 | Sugawa et al. | 398/67 |
| 2011/0235727 A1 | 9/2011 | Yeung et al. | |
| 2012/0128357 A1* | 5/2012 | Mukai et al. | 398/58 |
| 2012/0163808 A1 | 6/2012 | Kim et al. | |
| 2012/0166819 A1* | 6/2012 | Skubic et al. | 713/300 |
| 2013/0039182 A1 | 2/2013 | Das et al. | |

OTHER PUBLICATIONS

IEEE P1904.1, "Power Saving", Service Interoperability in Ethernet Passive Optical Networks (SIEPON), D1.0, Nov. 8, 2010, 19 pages.

IEEE Std. 802.3-2008, "Multipoint MAC Control", CSMA/CD, pp. 245-298.

Office Action for U.S. Appl. No. 13/327,418, dated May 23, 2013, 41 pages.

Office Action for U.S. Appl. No. 13/327,418, dated Dec. 6, 2013, 31 pages.

\* cited by examiner

POWER CONTROL IN AN OPTICAL NETWORK UNIT

FIELD

This application relates to passive optical networks.

BACKGROUND

Access networks connect business and residential subscribers to the central offices of service providers, which in turn are connected to metropolitan area networks (MANs) or wide area networks (WANs). Often, these access networks are hybrid fiber coax (HFC) systems with an optical fiber based feeder network between the central office and a remote node, and an electrical distribution network between the remote node and subscribers. In so-called "Fiber-to-the-x" (FTTx) access networks, the copper-based distribution part of the access network is replaced with optical fiber, e.g., fiber-to-the-curb (FTTC) or fiber-to-the-home (FTTH). In doing so, the capacity of the access network is increased.

Passive optical networks (PONs) are optical networks that can be used in such applications. A PON is a point-to-multipoint, fiber to the premises network architecture in which unpowered optical splitters are used to enable a single optical fiber to serve multiple premises. A PON consists of an optical line terminal (OLT) at the service provider's central office and a number of optical network units (ONUs) near end users. A PON configuration can reduce the amount of fiber and central office equipment required compared with point to point architectures. Examples of types of PONs that are defined by international standard bodies include Ethernet Passive Optical Networks (EPONs) and Gigabit Passive Optical Networks (GPONs).

Reducing power consumption in one or more components of a PON is desirable. For example, utilizing an ONU that consumes less power provides a business advantage. Moreover, there may be regulations placing limitations on the amount of power consumed in PONs.

In one proposed method for reducing power consumption in an ONU, the OLT transmits to the ONU a special Operation, Administration, and Management (OAM) frame that instructs the ONU to enter a "power saving mode" in which the ONU reduces power to its subsystems. The ONU remains in the power saving mode until a timer expires. During the power saving mode, the ONU does not transmit data to the OLT, even if it is granted a window to transmit the data and has data to transmit.

BRIEF DESCRIPTION

Embodiments of the present application will be described, by way of example only, with reference to the accompanying figures wherein.

Like reference numerals are used in different figures to denote similar elements.

DETAILED DESCRIPTION

Figure 1:
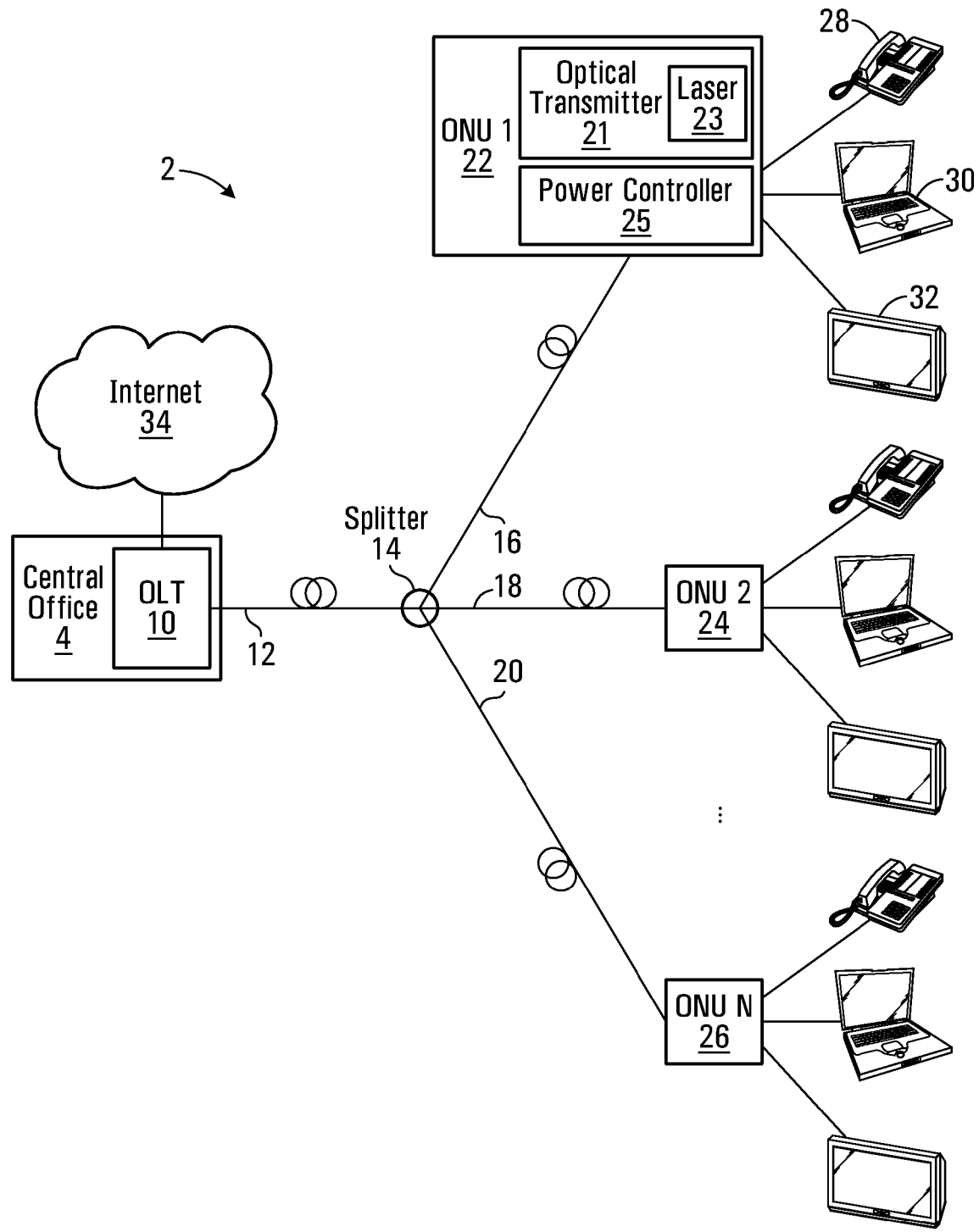
FIG. 1 is a block diagram illustrating a Passive Optical Network (PON)

In general, there are disclosed techniques for controlling power in an Optical Network Unit (ONU) in order to achieve power savings. In one embodiment disclosed herein, the ONU receives from the Optical Line Terminal (OLT) one or more messages defining a plurality of transmission windows during which data can be transmitted from the ONU to the OLT. For example, the messages may be 'GATE' messages in an Ethernet Passive Optical Network (EPON). A power controller in the ONU then controls the power to the optical transceiver in the ONU in accordance with the information defining the transmission windows in order to achieve the following: (1) to provide power to the transmitter portion of the optical transceiver beginning at a predetermined time in advance of a transmission window to ensure a laser in the transmitter portion of the optical transceiver is ready to begin transmitting data at the start of the transmission window; and (2) to refrain from providing full power to the transmitter portion of the optical transceiver during a period of time between transmission windows when the duration of time between the transmission windows is greater than the combined wake-up and shut-down time of the transmitter portion of the optical transceiver.

More generally, in accordance with one embodiment, there is provided a method of power control in an ONU of a PON, the ONU having an optical transmitter coupled to a power controller, the method comprising: (1) controlling a supply of power in accordance with information defining a plurality of transmission windows during which data can be transmitted from the ONU, to provide power to an optical transmitter in the ONU beginning at a predetermined time in advance of a transmission window of the plurality of transmission windows to ensure a laser in the optical transmitter is ready to begin transmitting the data at the start of the transmission window; and (2) controlling the supply of power in accordance with the information to refrain from providing full power to the optical transmitter during a period of time between the end of the transmission window and the start of a next transmission window of the plurality of transmission windows, when the duration of time between the end of the transmission window and the start of the next transmission window is greater than a predetermined length. A system for performing the method, as well as a computer readable medium having instructions stored thereon for performing the method, are also provided.

For illustrative purposes, embodiments will now be explained in greater detail below in conjunction with the figures.

The embodiments set forth herein represent the necessary information to enable those skilled to practice the claimed subject matter and illustrate the best mode of practicing such subject matter. Upon reading the following description in light of the accompanying figures, those skilled will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

Referring first to FIG. 1, an example of a PON 2 is illustrated. The PON 2 has a physical tree topology with a central office 4 located at the root and subscribers (e.g. 28, 30, and 32) connected to the leaf nodes of the tree. At the root of the tree is an OLT 10, which resides in service provider equipment (not shown) at the central office 4. The OLT 10 is the gateway that connects to the global Internet 34 and/or another network (not shown), such as a private network. The PON 2 connects the OLT 10 to multiple ONUs 22, 24, and 26 through a 1:N optical splitter/combiner 14. In the illustrated example, there are N ONUs, but only three are illustrated, specifically labeled "ONU 1" 22, "ONU 2" 24, . . . , "ONU N" 26. More specifically, a shared optical fiber 12 connects the OLT 10 to the 1:N optical splitter/combiner 14, and a respective optical fiber 16, 18, and 20 connects the 1:N optical splitter/combiner to each ONU 22, 24, and 26. The PON 2 is only one example of a PON. The embodiments described below can be implemented in other PONs.

In the example PON 2 illustrated in FIG. 1, each of the ONUs 22, 24, and 26 may serve a single residential or business subscriber, referred to as Fiber-to-the-Home/Business (FTTH/B), or multiple subscribers, referred to as Fiber-to-the-curb (FTTC). Each of the ONUs 22, 24, and 26 may be connected to one or more devices, such as a telephone, computer, printer, media access device, tablet, router and/or television set. In the specific example illustrated in FIG. 1, ONU 22 is shown connected to telephone 28, computer 30, and television 32.

Due to the directional properties of the optical splitter/combiner 14, the OLT 10 is able to broadcast data to all ONUs 22, 24, and 26 in the downstream direction. In the upstream direction, however, ONUs 22, 24, and 26 do not communicate directly with one another. Instead, each one of the ONUs 22, 24, and 26 is able to send data to the OLT 10. Thus, in the downstream direction the PON 2 may be viewed as a point-to-multipoint network, and in the upstream direction, the PON 2 may be viewed as a multipoint-to-point network.

For downstream traffic, the OLT 10 broadcasts content for all of the ONUs 22, 24, and 26 on a single broadcast channel. Addressing is used to identify the appropriate ONU for each packet of the content. For upstream traffic, the upstream bandwidth is time shared by all of the ONUs 22, 24, and 26, and only one ONU transmits data to the OLT 10 at a time to avoid traffic collision. The OLT 10 controls the time sharing of the bandwidth between the ONUs 22, 24, and 26 by allocating transmission windows to each ONU, during which each ONU is allowed to transmit upstream traffic. The transmission windows are granted using the time sharing scheme such that only one ONU can transmit to the OLT 10 at a time. When a new ONU (not shown) enters into the PON 2, the OLT 10 will not be aware of it and will not allocate any upstream capacity to it. To allow for new ONUs to join, the OLT 10 periodically allocates a "discovery window". The allocation is signalled on the downlink broadcast channel, so that all ONUs including a new ONU that has not yet registered can receive it.

A multipoint control protocol (MPCP) is used to facilitate the allocation of transmission windows and the joining of new ONUs. An example of a MPCP is described in the EPON portion of the collection of standards under IEEE Std 802.3.

The ONU 22 is an example of an ONU in accordance with one embodiment. The ONU 22 includes an optical transmitter 21 having a laser 23, as well as a power controller 25. The power controller 25 controls the supply of power to the optical transmitter 21 in accordance with information defining a plurality of transmission windows during which data can be transmitted from the ONU 22 in order to achieve the following: (1) to provide power to the optical transmitter 21 beginning at a predetermined time in advance of a transmission window of the plurality of transmission windows to ensure that the laser 23 is ready to begin transmitting the data at the start of the transmission window; and (2) to refrain from providing full power to the optical transmitter 21 during a period of time between the end of the transmission window and the start of a next transmission window of the plurality of transmission windows, when the duration of time between the end of the transmission window and the start of the next transmission window is greater than a predetermined length.

By refraining from providing "full" power to the optical transmitter 21, it is meant that the power supplied to the optical transmitter 21 is controlled to refrain from providing the amount of power that is normally provided to the optical transmitter 21 for proper operation of the optical transmitter 21. For example, if the power pin of the optical transmitter 21 is normally connected to a 3.3V power plane in a printed circuit board (PCB), refraining from providing full power may entail providing less voltage to the power pin than that provided by the 3.3V power plane. Or it may entail interrupting the connection between the power pin and the power plane so that no power is provided to the optical transmitter 21. Providing an amount of power less than full power, but more than no power may be advantageous in embodiments in which it is desirable to always maintain at least a "warm-up" power to the optical transmitter 21.

Figure 2:
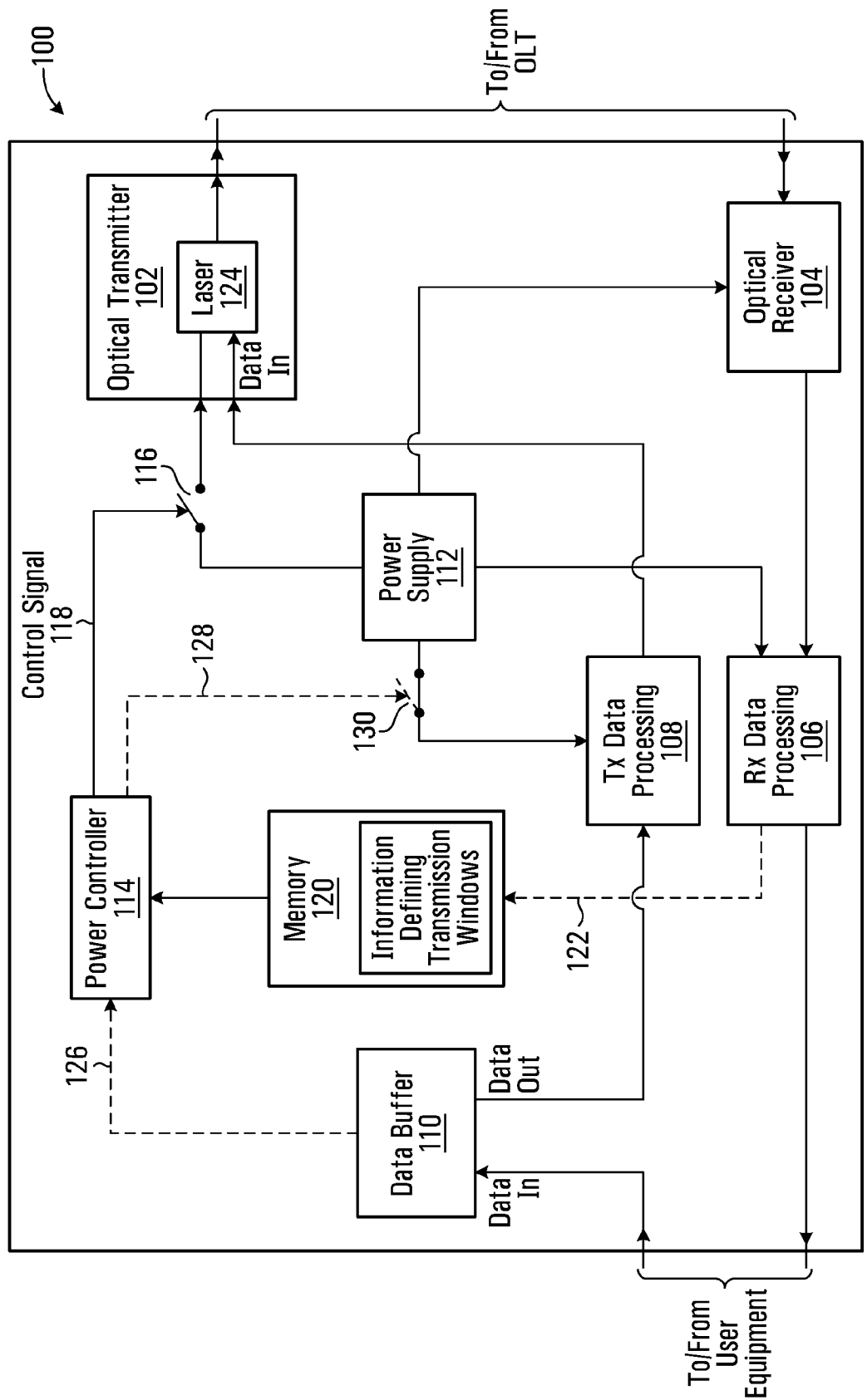
FIG. 2 is a block diagram illustrating an Optical Network Unit (ONU)

FIG. 2 shows in greater detail another ONU 100 in accordance with another embodiment. The ONU 100 is a specific example of the ONU 22 illustrated in the PON 2 of FIG. 1. It will be appreciated that not all of the components described and illustrated in the ONU 100 are required in order to perform the methods described below. It will also be appreciated that other components of the ONU 100 may also be present, but have been omitted for the sake of clarity.

As shown in FIG. 2, the ONU 100 includes an optical transmitter 102 for transmitting data to an OLT (e.g. OLT 10), and an optical receiver 104 for receiving data from the OLT.

In some embodiments, the transmitter 102 and the receiver 104 are integrated into a single optical transceiver (not shown).

The ONU 100 further includes at least one receive data processing block 106 for processing the data received from the optical receiver 104, as well as at least one transmit data processing block 108 for processing data to be transmitted by the optical transmitter 102. Examples of functions that may be performed by the receive processing block 106 include at least one of: deserializing the received data, performing decoding, performing decryption, and extracting received messages having information defining one or more transmission windows during which data may be transmitted from the ONU 100 to the OLT. Examples of functions that may be performed by the transmit processing block 108 include at least one of: serializing the data to be transmitted, performing encoding of the data to be transmitted, and performing encryption of the data to be transmitted.

The ONU 100 also includes a data buffer 110, which stores data from the user equipment ready to be transmitted to the OLT. A power supply 112 provides power to the components of the ONU 100, including the optical transmitter 102, the optical receiver 104, and the data processing blocks 106 and 108. In some embodiments, the power supply is a power plane of a printed circuit board.

The ONU 100 also includes a power controller 114 for controlling the supply of power to the optical transmitter 102. In the example illustrated in FIG. 2, this is achieved using a switch 116 interposed between the power supply 112 and the optical transmitter 102. When the switch 116 is open, power to the optical transmitter 102 is terminated. When the switch 116 is closed, power is provided to the optical transmitter 102. A control signal 118 generated by the power controller 114 controls the opening and closing of the switch 116.

In an alternative embodiment not shown, the switch 116 is instead integrated within the optical transmitter 102, and the power control signal 118 is provided to the transmitter 102 (e.g. on a dedicated pin) and controls the switch 116 within the transmitter 102. In another alternative embodiment not shown, instead of a switch 116, the power control signal 118 directly turns on and off a portion of the power supply 112 providing power to the optical transmitter 102.

Information defining transmission windows during which data can be transmitted from the ONU 100 to the OLT is stored in memory 120. In some embodiments, this information is extracted from data received from the OLT, while in other embodiments, this information is predetermined or dynamically updated in another manner, for example, through updates to the ONU 100 (e.g., by an update from the OLT, a user, or a technician). A stippled line 122 in FIG. 2 indicates that optionally this information may be extracted from the data received from the OLT.

In accordance with some embodiments, power savings is achieved by refraining from providing full power to the optical transmitter 102 during periods of time during which the ONU 100 has not been granted a transmission window. The power provided to the optical transmitter 102 is controlled so as to take into account wake-up and shut-down times for the optical transmitter 102. More specifically, some components of the optical transmitter 102, notably the laser 124 in the optical transmitter 102, require a wake-up period defined as the period of time between initially providing power to the optical transmitter 102 and the laser 124 being ready to begin transmitting data. The optical transmitter 102 also requires a shut-down time defined as the minimum amount of time during which the power must be terminated before the power can again be provided to the optical transmitter 102. Adhering to these wake-up and shut-down times ensures proper operation of the laser 124 in the optical transmitter 102. The specific durations of the wake-up and shut-down times may, for example, be specific to the manufacturer of the optical transmitter 102, but are known in advance.

Figure 3:
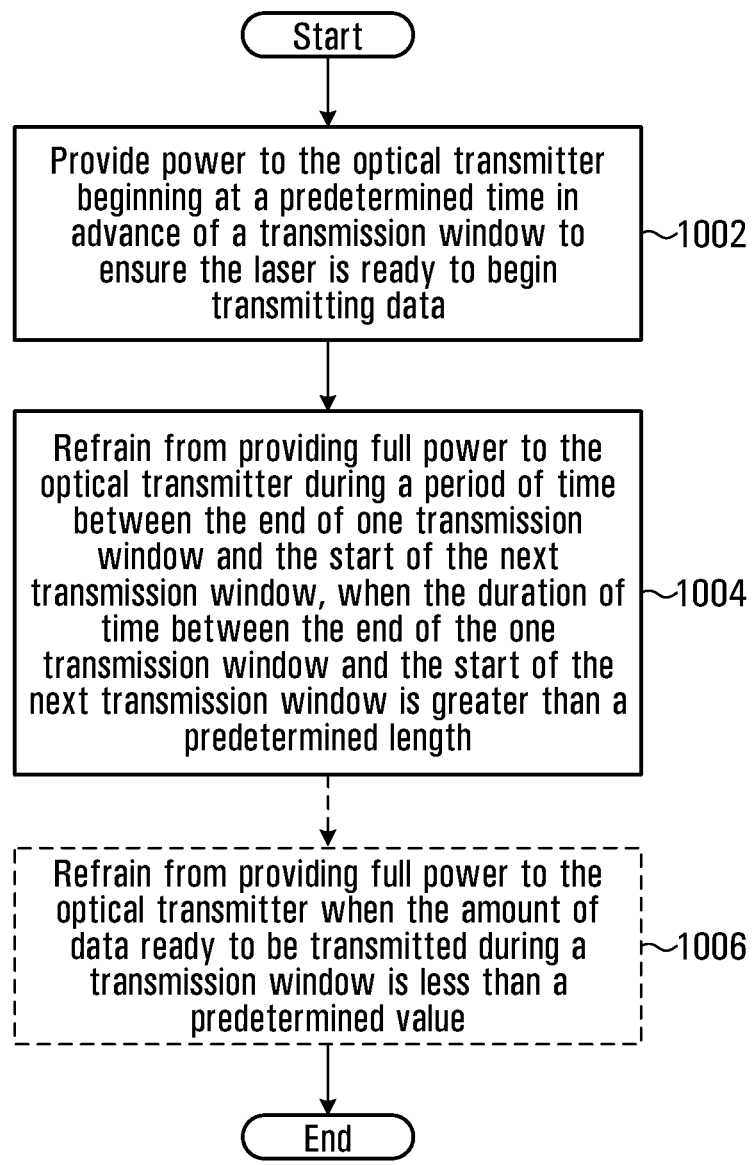
FIG. 3 is a flow chart of a method of controlling power to an optical transmitter.

The operation of the power controller 114 is described with reference to FIG. 3. In step 1002, the power controller 114 controls the supply of power to the optical transmitter 102 (via control signal 118) in accordance with the information defining the plurality of transmission windows stored in memory 120. Specifically, the power controller 114 controls the supply of power to provide power to the optical transmitter 102 beginning at a predetermined time in advance of a transmission window to ensure that the laser 124 in the optical transmitter 102 is ready to begin transmitting data at the start of the transmission window. In some embodiments, the duration of the predetermined time in advance of the transmission window is at least as great as the wake-up time required between initially proving power to the optical transmitter 102 and the laser 124 being ready to begin transmitting the data. Additionally, in some embodiments, the duration of the predetermined time may be programmable.

In step 1004, the power controller 114 also controls the supply of power in accordance with the information defining the plurality of transmission windows in order to refrain from providing full power to the optical transmitter 102 during a period of time between the end of the transmission window and the start of a next transmission window, when the duration of time between the end of the transmission window and the start of the next transmission window is greater than a predetermined length. In some embodiments, this predetermined length is a summation of the period of time required for the optical transmitter 102 to wake-up and the period of time required for the optical transmitter 102 to shut-down. Additionally, in some embodiments, this predetermined length may be programmable.

The period of time between the end of the transmission window and the start of the next transmission window during which the power controller 114 refrains from providing full power to the optical transmitter 102 may be the period of time beginning at the end of the transmission window and finishing at the predetermined time in advance of the next transmission window. This scenario is illustrated and described later in the example described with reference to FIG. 11. Alternatively, the power controller 114 may refrain from providing full power to the optical transmitter 102 during a subset of the period of time beginning at the end of the transmission window and finishing at the predetermined time in advance of the next transmission window.

Referring back to FIG. 2, in some embodiments, optionally, the power controller 114 also receives from the data buffer 110 an indication of the amount of data stored in the data buffer 110 that is ready for transmission to the OLT. This is shown via stippled line 126 in FIG. 2. In this embodiment, an optional step 1006 is shown in FIG. 3 in which the power controller 114 additionally controls the supply of power to refrain from providing full power to the optical transmitter 102 during a transmission window in which the data ready to be transmitted satisfies a criterion. The criterion may be, for example, that the amount of data ready to be transmitted is less than a predetermined value. Additionally, or alternatively, the power controller 114 may also receive from the data buffer 110, or from another source, an indication of the priority of the data. In this case, the criterion may be that the data ready to be transmitted is low priority, or the criterion may be that the data ready to be transmitted is not time sensitive. Multiple criteria may be combined (e.g., amount of data in the data buffer 110 and priority of the data) by the power controller 114 to make a decision to provide power to the optical transmitter 102.

In some embodiments, the power controller 114 also controls the power supplied to the transmit data processing block 108. Notably, if there is no power being provided to the optical transmitter 102, then typically no power is required for the transmit data processing block 108, as it will not need to prepare data for transmission since no data is being transmitted. In order to illustrate this optional embodiment, in FIG. 2 a stippled line is illustrated representing a control signal 128 that controls the supply of power to the transmit data processing block 108 using a switch 130. The control signal 128 may be the same control signal as control signal 118, or it may be a different control signal. The advantage of using a different control signal 128 is that in general the wake-up and shut-down times of the circuitry in the transmit data processing block 108 will be different from, and likely shorter than, the wake-up and shut-down times of the optical transmitter 102. This is because the laser 124 in the optical transmitter 102 may require longer wake-up and shut-down times than other digital circuit components.

Figure 4:
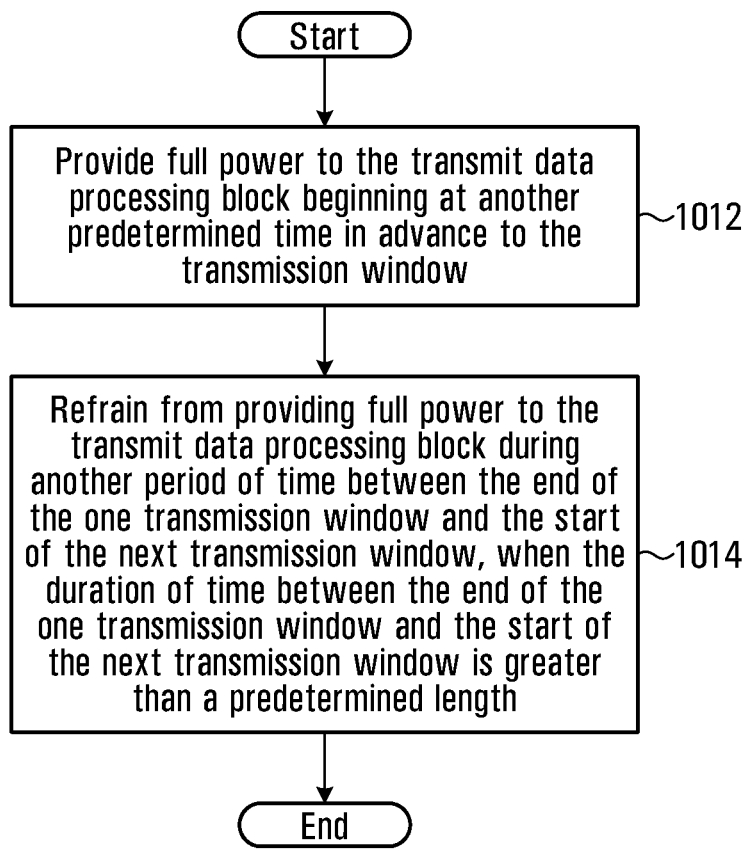
FIG. 4 is a flow chart of a method of controlling power to a data processing block.

The operation of the power controller 114 and control signal 128 is described with reference to FIG. 4. In step 1012, the power controller 114 controls the supply of power to the transmit data processing block 108 (via control signal 128) in accordance with the information defining the plurality of transmission windows stored in memory 120. Specifically, the power controller 114 controls the supply of power to provide full power to the transmit data processing block 108 beginning at a predetermined time in advance of the transmission window. In many cases, this predetermined time is different from the predetermined time in step 1002 of FIG. 3.

In step 1014, the power controller 114 also controls the supply of power in accordance with the information defining the plurality of transmission windows to refrain from providing full power to the transmit data processing block 108 during a period of time between the end of the transmission window and the start of the next transmission window, when the duration of time between the end of the transmission window and the start of the next transmission window is greater than a predetermined length. In many cases, this period of time is different from the period of time in step 1004 of FIG. 3, and this predetermined length is different from the predetermined length in step 1004 of FIG. 3.

By providing "full" power to the transmit data processing block 108, it is meant that the amount of power supplied to the transmit data processing block 108 is the amount that is normally required for proper operation of the transmit data processing block 108. Refraining from providing full power to the transmit data processing block 108 may entail providing an amount of power less than the full power, or may entail providing no power to the transmit data processing block 108 (e.g. by interrupting the connection between a power supply and the transmit data processing block 108).

In some embodiments, the wake-up and shut-down times of the circuitry in the data processing block 108 will be negligible relative to the corresponding times for the optical transmitter 102, in which case the power controller 114 can simply control the supply of power to the transmit data processing block 108 (via control signal 128) to refrain from providing full power to the transmit data processing block 108 between the transmission windows.

Thus, by performing the methods described above, power savings can be achieved by controlling in the ONU 100 the supply of power to the optical transmitter 102 and (possibly) to the transmit data processing block 108. The control of the supply of power is performed by the power controller 114, as described above. The power controller 114 may be operational all of the time, or in some embodiments, the power controller 114 may be selectively turned on and off by the OLT, for example, via a special Operation, Administration, and Management (OAM) frame.

Further to the above, a specific example will now be described in detail below in the context of an Ethernet Passive Optical Network (EPON).

Figure 5:
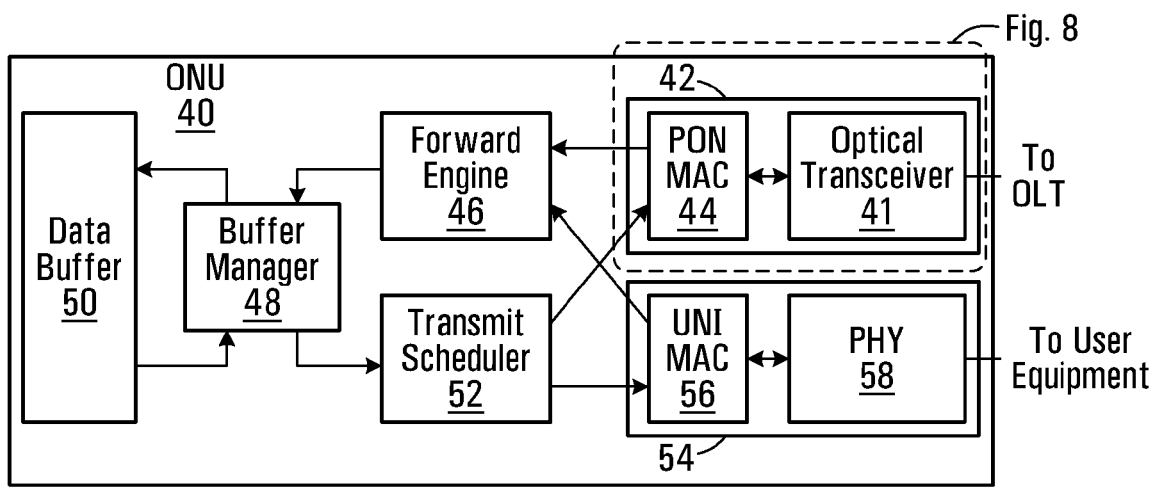
FIG. 5 is a block diagram illustrating another ONU.

Turning therefore to FIG. 5, another ONU 40 is illustrated. The ONU 40 can also be considered a specific example of the ONU 22 illustrated in the PON 2 of FIG. 1, or a more specific example of the ONU 100 in FIG. 2.

It will be appreciated that not all the components illustrated and described in the ONU 40 are required in order to perform the methods described below. It will also be appreciated that other components of the ONU 40 may also be present, but have been omitted for the sake of clarity.

As shown in FIG. 5, the ONU 40 includes an interface 42 to a PON (e.g. PON 2), which includes physical layer components such as an optical transceiver 41, as well as a PON Medium Access Control (MAC) module 44. The ONU 40 further includes a forward engine 46, a data buffer 50 under the control of a buffer manager 48, a transmit scheduler 52, and an interface 54 to user equipment (not shown). The interface 54 to the user equipment includes a User to Network Interface (UNI) MAC 56 and physical layer components 58.

An example of the operation of the ONU 40 is described with reference to FIGS. 6 and 7.

Figure 6:
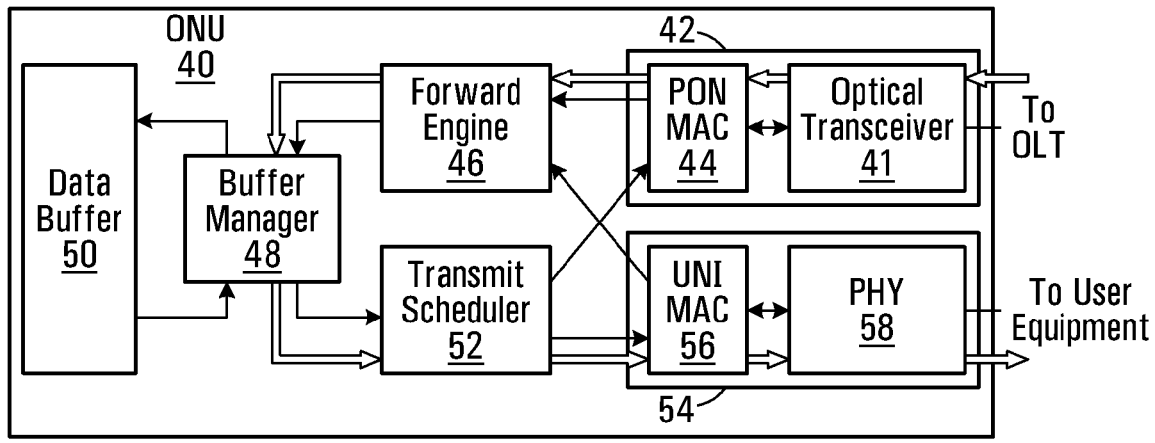
FIG. 6 is a block diagram showing the flow of data through the ONU of FIG. 5.

As shown in FIG. 6, when data is received at the optical transceiver 41 from the OLT, the data is processed by the physical layer components of the interface 42, and then by the PON MAC module 44. The PON MAC module 44 performs a number of functions relating to the MPCP, and is described in greater detail below with reference to FIG. 8. Notably, as will be described below, the PON MAC module 44 includes the power controller for controlling the optical transmitter portion of the optical transceiver 41.

Data packets from the PON MAC module 44 are forwarded to the forward engine 46, which determines the destination of each packet (e.g. the appropriate port in the user equipment) and how to handle the packet (e.g. whether the packet should be dropped). The buffer manager 48 receives packets from the forward engine 46 and coordinates storing these packets in the data buffer 50 (if necessary) until they can be transmitted to the user equipment. The transmit scheduler 52 schedules the transmission of the packets to the user equipment via interface 54.

Figure 7:
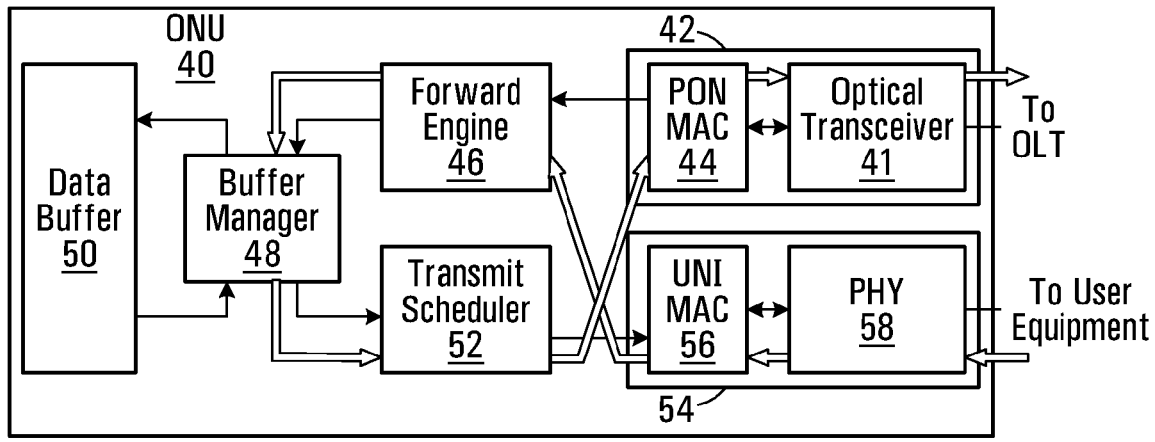
FIG. 7 is a block diagram showing another flow of data through the ONU of FIG. 5.

On the other hand, as shown in FIG. 7, when data is received at the interface 54 of the user equipment for transmission to the OLT, the data packets are forwarded to the forward engine 46, which determines the destination of the packets and how the packets are to be handled. The buffer manager 48 receives these packets from the forward engine 46 and coordinates storing these packets in the data buffer 50 until a transmission window is available for the ONU 40 to transmit the packets to the OLT. The transmit scheduler 52 schedules the transmission of the packets to the OLT via interface 42.

Figure 8:
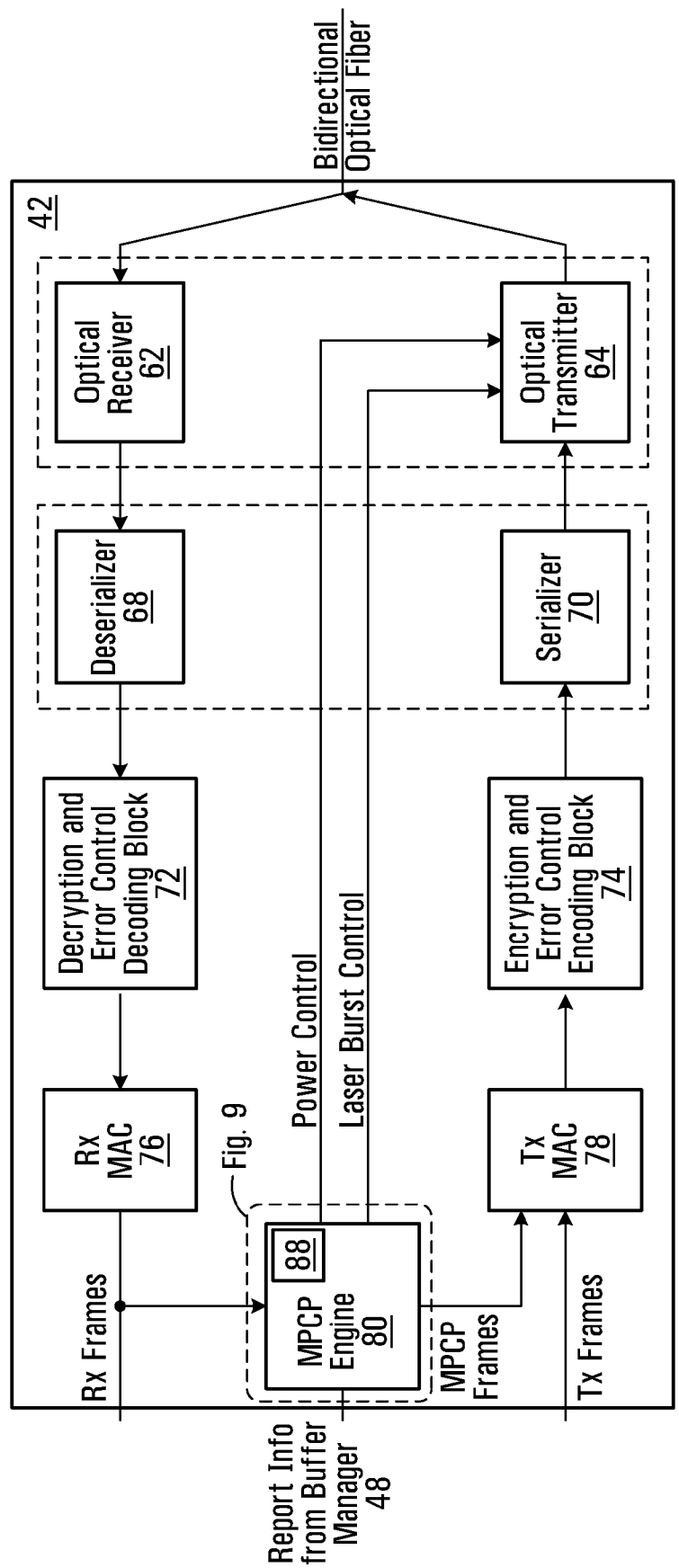
FIG. 8 is a block diagram illustrating a component of the ONU of FIG. 5 in more detail.

The interface 42 to the OLT is shown in greater detail in FIG. 8. It will be appreciated that some components of the interface 42 (e.g. the clock data recovery module) may also be present, but have been omitted for the sake of clarity.

As shown in FIG. 8, the optical transceiver 41 comprises two portions: an optical receiver 62 and an optical transmitter 64. It will be appreciated that separate receiver and transmitter portions have been shown for the sake of clarity. In actual implementations the receiver and transmitter may share some common circuitry to implement the optical transceiver 41, as is known in the art.

The interface 42 also includes data processing blocks including a deserializer 68, a serializer 70, a processing block 72 for performing decryption and error control decoding of incoming data, and another processing block 74 for performing encryption and error control encoding for outgoing data. The deserializer 68 and serializer 70 are shown as integrated in a single serializer/deserialier or 'SerDes' block 66. The other processing blocks may be similarly integrated, although this is not shown.

The interface 42 further includes: (i) a receive MAC block 76 for mapping the received data into frames readable by higher layers, (ii) a transmit MAC block 78 for removing such frames, and (iii) an MPCP engine 80 for processing MPCP frames and for controlling the power to the optical transmitter 64 and turning on and off a laser in the optical transmitter 64 to transmit the data.

In operation, data from the OLT is received by optical receiver 62 and then deserialized in deserializer 68. Decryption and error control decoding is then performed in processing block 72. The decrypted and decoded data is then forwarded to the receive MAC block 76, which maps the data stream into frames. The received data frames are then forwarded to the forward engine 46.

When data from the user equipment is to be transmitted to the OLT, the transmit MAC block 78 accepts the data frames from the transmit scheduler 52, removes the framing structure, and forwards the data to processing block 74 for encryption and encoding. The encrypted and encoded data is then serialized in serializer 70 and the serial data stream is transmitted to the OLT via optical transmitter 64. The MPCP engine 80 controls the power to the optical transmitter 64 and turns on and off a laser in the optical transmitter 64 as will be explained in detail below.

The MPCP engine 80 is responsible for implementing the MPCP. To achieve this, the MPCP engine 80 receives and generates MPCP frames. Therefore, one of the functions of the MPCP engine 80 is to monitor the received frames output by receive MAC block 76 and to extract any MPCP related frames. Examples of MPCP frames that the MPCP engine 80 extracts from a transmission from the OLT can include:

1) 'GATE' messages—each GATE message defines one or more transmission windows during which the ONU 40 is permitted to transmit data in data buffer 50 to the OLT. The OLT assigns the transmission windows dynamically based on the amount of data in buffer 50 and to ensure multiple ONUs do not transmit data to the OLT at the same time.
2) 'DISCOVERY_GATE' messages—each DISCOVERY_GATE message defines a discovery window that allows a newly connected or offline ONU to register with the OLT.
3) 'REGISTER' messages—a 'REGISTER' message is transmitted from the OLT to the ONU as part of the registration handshaking process when the ONU first registers with the OLT.

Examples of MPCP frames generated by the MPCP engine 80 for transmission to the OLT can include:

1) 'REPORT' messages—each REPORT message provides information to the OLT that is representative of the amount of data in buffer 50 waiting for transmission. The OLT takes this information into account when granting duration and periodicity of transmission windows in GATE messages. The REPORT message can provide other information also, such as a time stamp used by the OLT for round-trip-time calculations.
2) 'REGISTER_REQ' AND 'REGISTER_ACK' messages—these messages are transmitted to the OLT from the ONU as part of the registration handshaking process when the ONU first registers with the OLT.

Other embodiments may use different MPCP frames (e.g., a single frame with gate, report, and register functionality defined within the frame, or frame groups representing this information). Regardless, what is important is that the MPCP engine 80 can receive and transmit messages that allow it to control power to the optical transmitter 102 in the manner explained in detail below.

Figure 9:
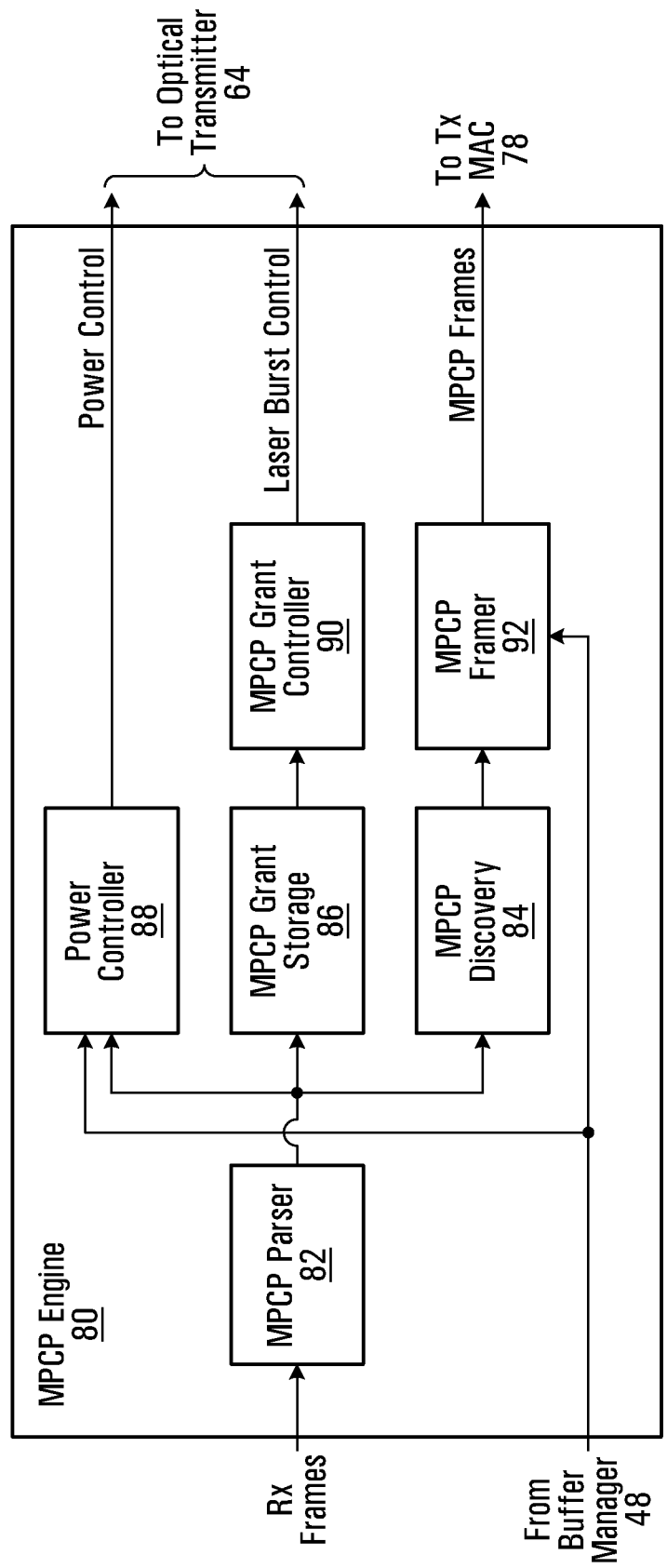
FIG. 9 is a block diagram illustrating another component of the ONU of FIG. 5 in more detail.

The MPCP engine 80 is shown in greater detail in FIG. 9. It will be appreciated that not all of the components illustrated and described in the MPCP engine 80 are required in order to perform the methods described below. It will also be appreciated that other components of the MPCP engine 80 may also be present, but have been omitted for the sake of clarity.

As shown in FIG. 9, the MPCP engine 80 includes an MPCP parser 82 for parsing out MPCP frames from the received data.

DISCOVERY_GATE messages extracted by the MPCP parser 82 are transmitted to MPCP discovery module 84, which is responsible for receiving and transmitting MPCP frames relating to the handshaking process for registering with the OLT (e.g. REGISTER, REGISTER_REQ, and REGISTER_ACK frames).

GATE messages extracted by the MPCP parser 82 are forwarded to an MPCP grant storage module 86 and a power controller 88. The MPCP grant storage module 86 operates in conjunction with an MPCP gate controller 90 to control turning on and off a laser in the optical transmitter 64 in accordance with the transmission windows defined by the GATE messages. The power controller 88 controls the supply of power to the optical transmitter 64 using (i) the information defining the transmission windows, and (ii) information from the data manager 48 representative of the amount of data in the buffer 50 ready to be transmitted to the OLT. The operation of the power controller 88 is described in more detail below.

The MPCP engine 80 further includes an MPCP framer 92, which generates MPCP frames to be transmitted to the OLT. The MPCP framer 92 also receives the information from the buffer manager 48 representative of the amount of data in the buffer 50 ready to be transmitted to the OLT. The MPCP framer 92 reports this information in the REPORT messages.

The operation of the power controller 88 will now be described below with reference to FIGS. 10 and 11.

Figure 10:
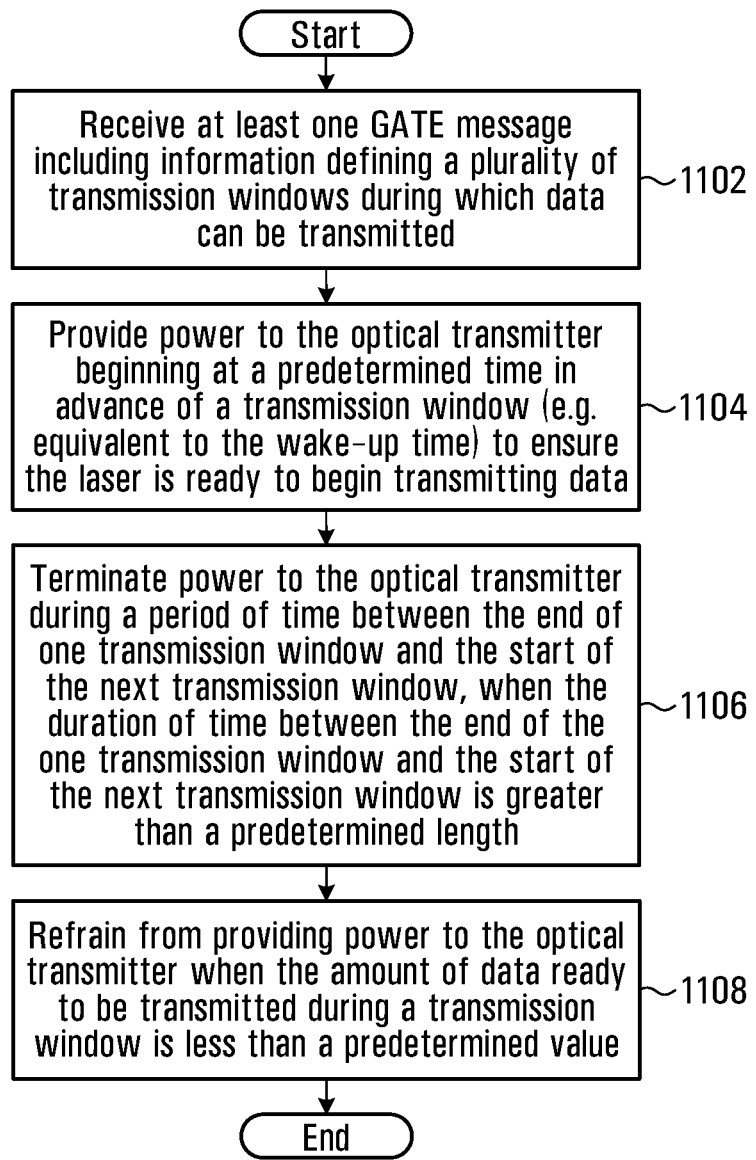
FIG. 10 is another flow chart of a method of controlling power to an optical transmitter.
Figure 11:
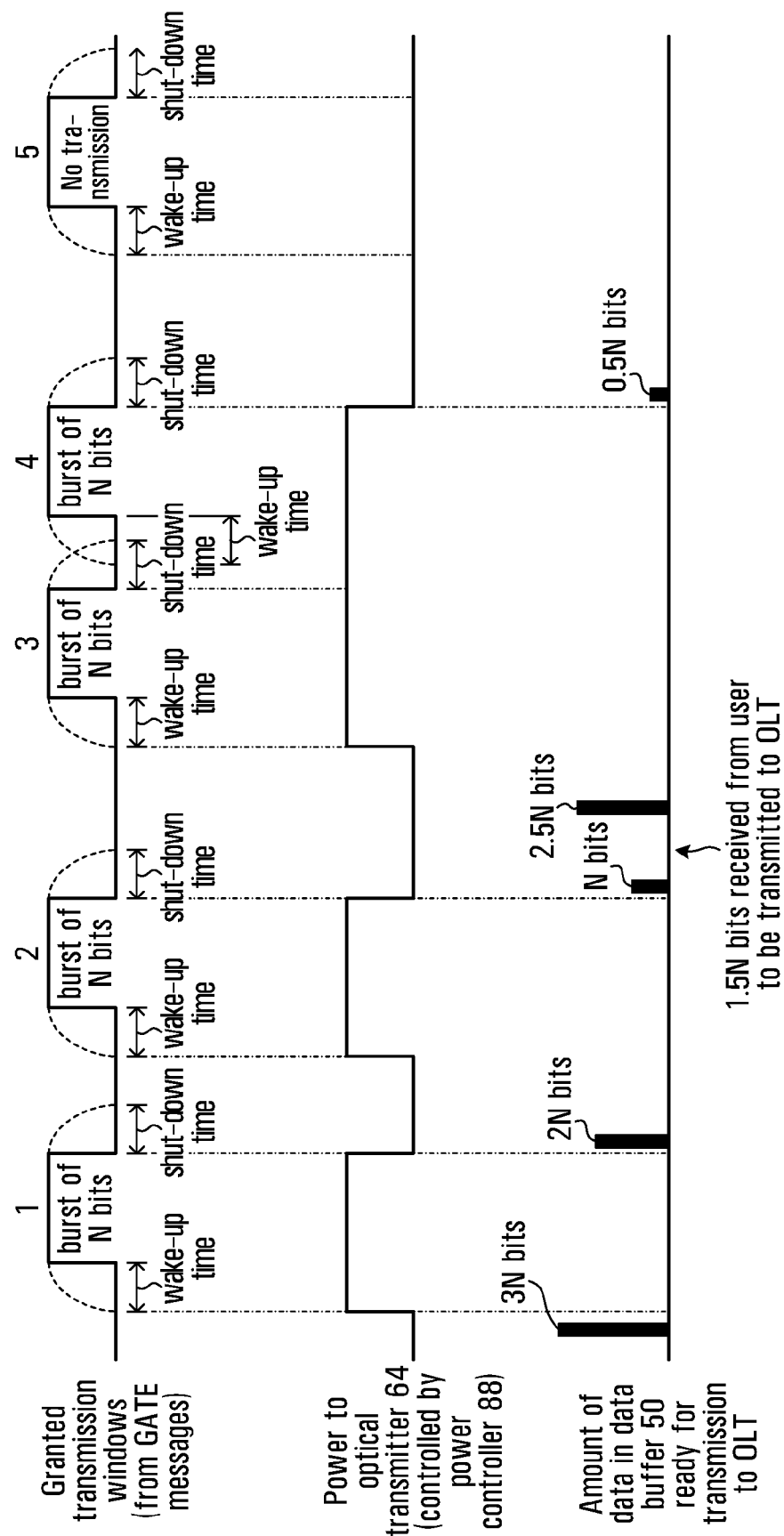
FIG. 11 is an example of the power control operation applied to five transmission windows.

Turning therefore to FIG. 10, first in step 1102, the power controller 88 receives from the MPCP parser 82 at least one GATE message which includes information defining a plurality of transmission windows during which data in the data buffer 50 can be transmitted from the ONU 40 to the OLT. This information may be stored in memory (not shown) in the ONU 40.

In step 1104, the power controller 88 controls the supply of power in accordance with the information in the at least one GATE message to provide power to the optical transmitter 64 beginning at a predetermined time in advance of a transmission window to ensure that a laser in the optical transmitter 64 is ready to begin transmitting the data at the start of the transmission window.

In step 1106, the power controller 88 also controls the supply of power in accordance with the information in the at least one GATE message to refrain from providing full power to the optical transmitter 64 during a period of time between the end of the transmission window and the start of a next transmission window, when the duration of time between the end of the transmission window and the start of the next transmission window is greater than a predetermined length. In this illustrated example, the power controller 88 refrains from providing full power by simply terminating the power.

The predetermined length in this example is a length at least as great as a summation of a period of time required for the optical transmitter 64 to wake-up and a period of time required for the optical transmitter 64 to shut-down. Notably, it is not possible for the laser in the optical transmitter 64 to transmit a laser beam as soon as power is provided to the optical transmitter 64. Instead, a wake-up time is required in order to be sure that the laser is in the 'hot-working state' necessary to properly transmit the laser beam. Similarly, due to operational requirements and/or energy store/release requirements in the circuitry in the optical transmitter 64, a shut-down time is required corresponding to the minimum amount of time during which the power to the optical transmitter 64 must be terminated before the power can again be provided to the optical transmitter 64 to ensure proper operation of the laser. The duration of the wake-up and shut-down times are specific to the optical transmitter 64, and are provided to the power controller 88 in advance, for example during manufacture or during initialization of the ONU 40.

Therefore, in step 1106, the power controller 88 only terminates the power to the optical transmitter 64 between adjacent transmission windows if the period of time between the transmission windows is at least as great as the summation of the wake-up time and the shut-down time of the optical transmitter 64. For example, FIG. 11 shows five transmission windows that have been granted for transmitting data from the ONU 40 to the OLT. These transmission windows were granted in a plurality of received GATE messages. The power controller 88 terminates the power between transmission windows 1 and 2, and between transmission windows 2 and 3, but does not terminate the power between transmission windows 3 and 4 because the duration of time between transmission windows 3 and 4 is not greater than the combined wake-up time and shut-down time of the optical transmitter. Additionally, as per step 1104 of FIG. 10, the power controller 88 also controls the power to the optical transmitter 64 to ensure power is provided to the optical transmitter 64 beginning at a predetermined time (in this case equivalent to the wake-up time) in advance of each of transmission windows 1, 2, and 3, in order to ensure the laser in the optical transmitter 64 is ready to begin transmitting data at the start of each of these transmission windows.

Returning to FIG. 10, in step 1108, the power controller 88 uses the information from the data manager 48 representative of the amount of data ready to be transmitted in order to further control the power to the optical transmitter 64. Specifically, the power controller 88 controls the supply of power to not provide power to the optical transmitter 64 during a transmission window in which the amount of data ready to be transmitted is less than a predetermined value. For example, in FIG. 11, it is assumed that N bits of data from buffer 50 are transmitted during each of granted transmission windows 1 to 4. It is also assumed that the predetermined value in the example in FIG. 11 is N. Therefore, since there are only 0.5N bits ready to be transmitted during granted transmission window 5, the power controller 88 controls the supply of power to not provide power to the optical transmitter 64 during transmission window 5. These 0.5N bits will be transmitted in a subsequent granted transmission window once more data has been received in buffer 50 for transmission.

Even if the MPCP gate controller 90 sends a control signal to the optical transmitter 64 to control the optical transmitter 64 to emit a laser beam to transmit data during transmission window 5, the optical transmitter 64 will not do so because it is not powered. Therefore, it is not necessary to modify the conventional operation of the MPCP gate controller 90 to only send this control signal when power is provided to the optical transmitter 64, since if the power is not provided to the optical transmitter 64, the laser will simply not operate.

In some embodiments, during step 1108, the ONU 40 may also ignore status report requests, and therefore refrain from transmitting REPORT messages, if the data in the buffer 50 is below the predetermined value. The advantage of such an embodiment is that the ONU 40 avoids supplying power to the optical transmitter 64 only (or primarily) to transmit a REPORT message. However, such an embodiment may not be desirable if the standard governing the operation of the ONU 40 places constraints on how often REPORT messages are to be transmitted. As a compromise, in one embodiment, during step 1108, the ONU 40 may ignore one status report request (or, in some embodiments, a greater pre-set number of status report requests) if the data in the buffer 50 is below the predetermined value. Additional status report requests received during step 1108 are not ignored.

In some embodiments, the power controller 88 also receives from the data manager 48 an indication of the priority of the data. If the data manager 48 indicates that the data ready for transmission is high priority or time sensitive, the power controller 88 omits step 1108.

Figure 12:
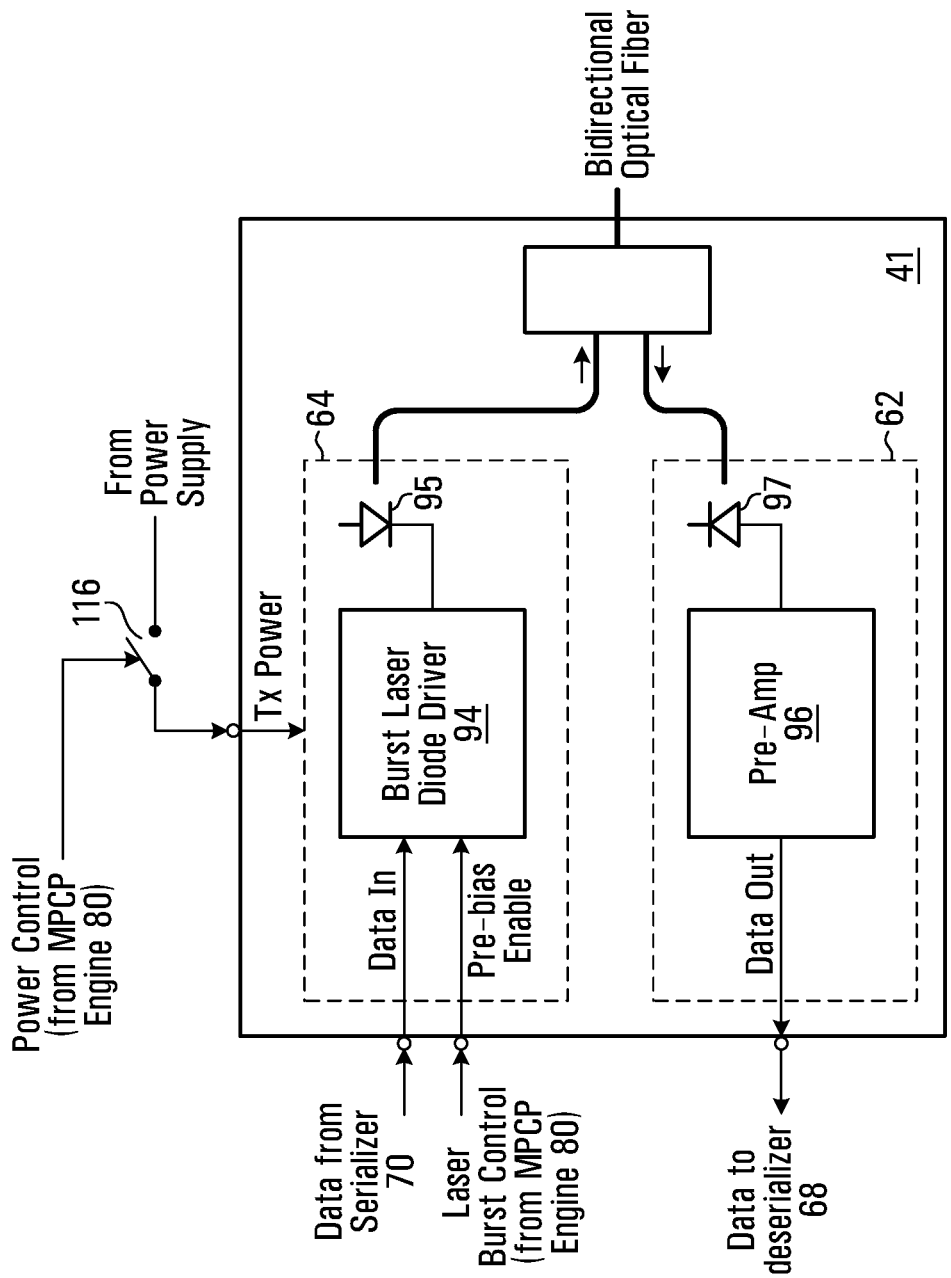
FIG. 12 is a block diagram illustrating an optical transceiver.

An example of an optical transceiver 41 having optical transmitter 64 is shown in greater detail in FIG. 12. It will be appreciated that other components of the optical transceiver 41 may also be present, but have been omitted for the sake of clarity.

The optical transmitter 64 includes a burst laser diode driver 94 that drives a laser, such as a laser diode 95. The laser burst control signal from the MPCP engine 80 drives a pre-bias enable to turn on and off the laser beam emitted by the laser diode 95.

The optical receiver 62 includes a photo diode 97 for receiving an optical signal, as well as a pre-amp 96 and possible other processing circuitry (not shown) for processing the received optical signal.

The receiver 62 and the transmitter 64 can be powered separately via a power supply. The power supply may be, for example, a power plane in a printed circuit board (PCB). A switch 98 is interposed between the power supply and the transmit power pin. The switch 98 is controlled by the power control signal from the MPCP engine 80 in order to provide and terminate power to the optical transmitter 64 in the manner described above.

In an alternative embodiment not shown, the switch 98 is instead integrated within the optical transceiver 41, and the transmit power pin is directly connected to the power supply. The power control signal is then received by the transceiver 41 at another dedicated pin (not shown) which directly controls the switch 98 in the optical transceiver 41. This alternative embodiment is advantageous in implementations in which it is desired or necessary to keep the transmit power pin continuously connected to the power supply, for example to provide a minimum amount of constant power to some other processing blocks in the transceiver 41.

In another alternative embodiment not shown, instead of a switch 98, the power control signal from the MPCP engine 80 directly turns on and off a portion of the power supply providing power to the optical transmitter 64.

In addition to controlling the power to optical transmitter 64, the power controller 88 can also control the power to one or more of the data processing blocks, for example, the serializer 70 and/or the encryption and encoding block 74. If there is no power being provided to the optical transmitter 64, then typically no power is required for data processing blocks 70 and 74, as they will not need to prepare data for transmission since no data is being transmitted. Similarly, the power controller 88 can also control the power to Tx MAC block 78, as some or all of this block may not need to be powered if there is no data being transmitted.

Figure 13:
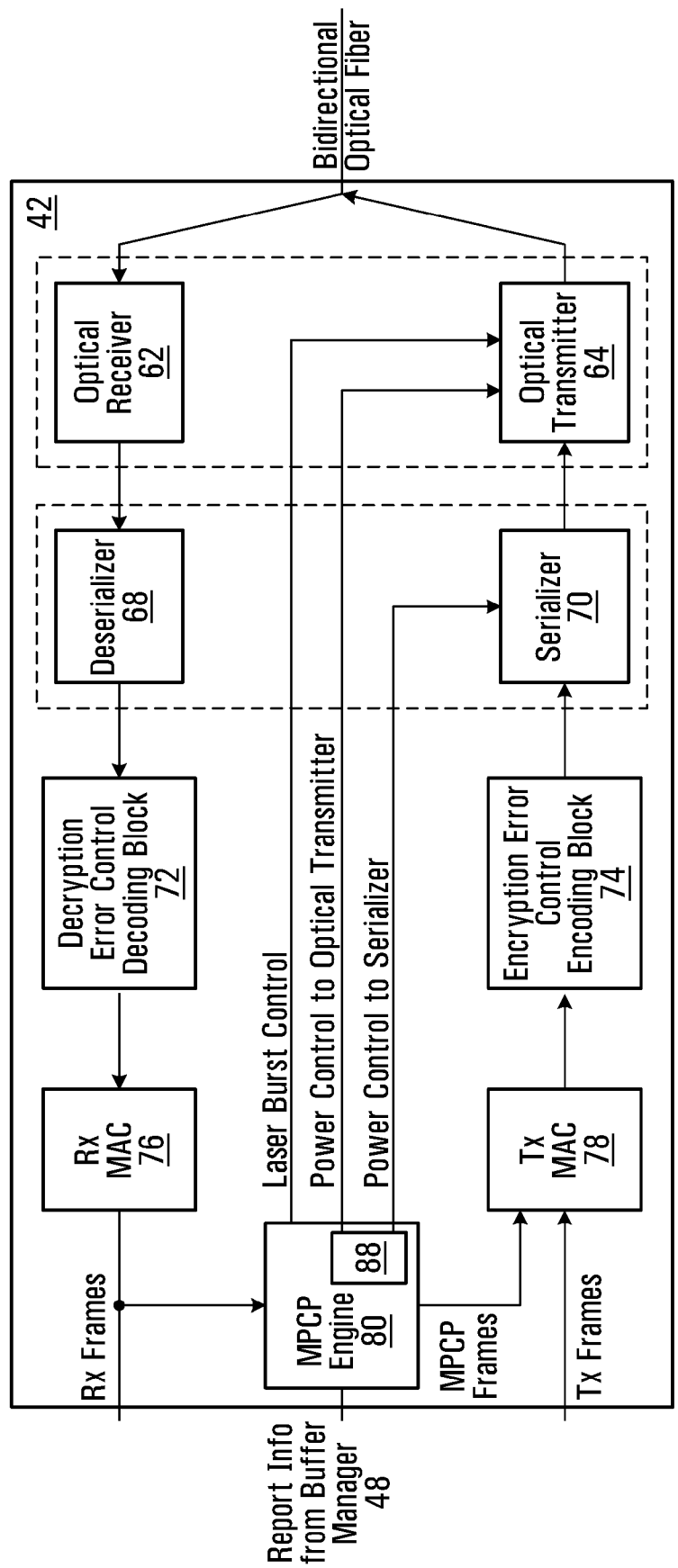
FIG. 13 illustrates an ONU that controls the supply of power to a serializer.
Figure 14:
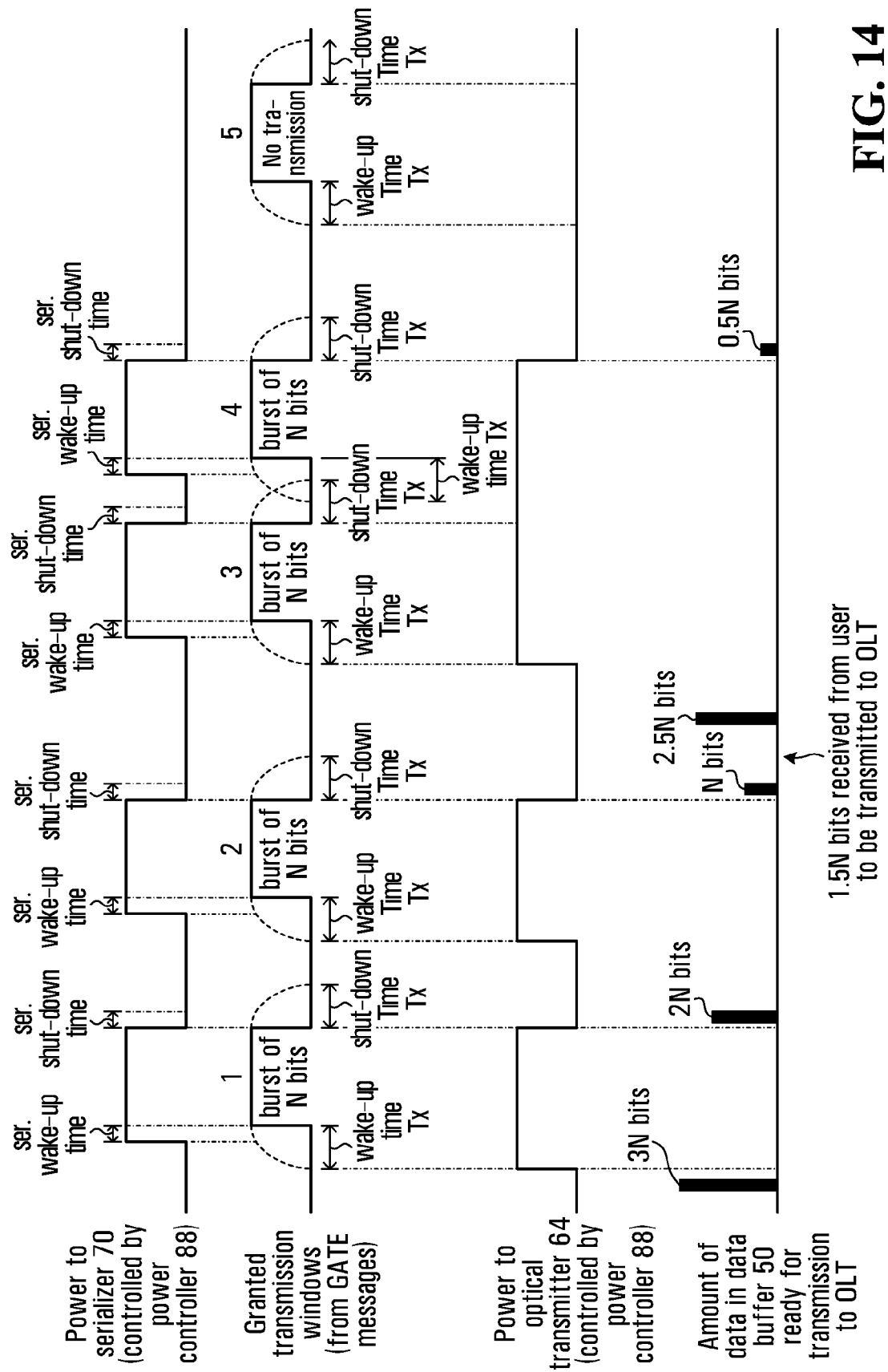
FIG. 14 is another example of the power control operation applied to five transmission windows.

As an example, FIGS. 13 and 14 illustrate an embodiment in which power to the serializer 70 is also controlled. As shown in FIG. 13, the power controller 88 in MPCP engine 80 also provides a control signal to the serializer 70 of SerDes 66. As shown in FIG. 14, power to the serializer 70 is provided and terminated in the same manner as the power to the optical transmitter 64, with the following exception: in general the wake-up and shut-down times of the serializer 70 are different from the wake-up and shut-down times of the optical transmitter 64. Therefore, the period of time in advance of a transmission window during which power must be provided to the serializer 70 is different from the period of time in advance of a transmission window during which power must be provided to the optical transmitter 64. In the example in FIG. 14, it is assumed that the wake-up and shut-down times of the serializer 70 are shorter than the wake-up and shut-down times of the optical transmitter 64, and therefore between some adjacent transmission windows (such as between transmission window 3 and 4 in FIG. 14), the serializer 70 is powered-down to save power, whereas the optical transmitter 64 is not.

It will be noted that the power to the optical receiver 62 is not necessarily controlled in the same manner as the power to the optical transmitter 64. This is because the optical receiver 62 remains continuously powered so that it is ready to receive data broadcast from the OLT at any time.

Although the foregoing has been described with reference to certain specific embodiments, various modifications thereof will be apparent to those skilled in the art without departing from the scope of the claims appended hereto.

The invention claimed is:

1. A method of power control in an Optical Network Unit (ONU), the ONU having an optical transmitter coupled to a power controller, the method comprising:
    receiving at least one message at the ONU, the at least one message comprising information defining a plurality of transmission windows during which data can be transmitted from the ONU;
    controlling a supply of power, in accordance with the information from the at least one message received at the ONU that defines the plurality of transmission windows, to provide power to an optical transmitter in the ONU beginning at a predetermined time in advance of a transmission window of the plurality of transmission windows to ensure a laser in the optical transmitter is ready to begin transmitting the data at the start of the transmission window;
    controlling the supply of power, in accordance with the information from the at least one message received at the ONU that defines the plurality of transmission windows, to refrain from providing full power to the optical transmitter during a period of time between the end of the transmission window and the start of a next transmission window of the plurality of transmission windows, when the duration of time between the end of the transmission window and the start of the next transmission window is greater than a predetermined length.

2. The method of claim 1, wherein said controlling the supply of power to refrain from providing full power to the optical transmitter during a period of time between the end of the transmission window and the start of a next transmission window comprises controlling the supply of power to refrain from providing any power to the optical transmitter during a period of time between the end of the transmission window and the start of the next transmission window.

3. The method of claim 1 further comprising:
    if data ready to be transmitted from the ONU during one transmission window of the plurality of transmission windows satisfies a criterion:
        controlling the supply of power to refrain from providing full power to the optical transmitter during the one transmission window.

4. The method of claim 3 wherein the criterion is that the amount of the data ready to be transmitted is less than a predetermined value.

5. The method of claim 1 wherein the predetermined length is at least as great as a summation of a period of time required for the optical transmitter to wake-up and a period of time required for the optical transmitter to shut-down.

6. The method of claim 5 wherein the period of time required for the optical transmitter to wake-up is representative of the time between initially providing power to the optical transmitter and the laser being ready to begin transmitting the data, and wherein the period of time required for the optical transmitter to shut-down is representative of a minimum amount of time during which the power must be terminated before the power can again be provided to the optical transmitter.

7. The method of claim 1 further comprising:
    controlling the supply of power in accordance with the information to provide full power to a data processing block in the ONU during the transmission window;
    controlling the supply of power in accordance with the information to refrain from providing full power to the data processing block during a period of time between the end of the transmission window and the start of the next transmission window.

8. The method of claim 1 wherein the optical transmitter is a transmission portion of an optical transceiver in the ONU.

9. An Optical Network Unit (ONU) comprising:
    an optical transmitter having a laser;
    an optical receiver for receiving at least one message at the ONU, the at least one message comprising information defining a plurality of transmission windows during which data can be transmitted from the ONU;
    a power controller for:
        controlling a supply of power, in accordance with the information from the at least one message received at the ONU that defines the plurality of transmission windows, to provide power to the optical transmitter beginning at a predetermined time in advance of a transmission window of the plurality of transmission windows to ensure the laser is ready to begin transmitting the data at the start of the transmission window;
        controlling the supply of power, in accordance with the information from the at least one message received at the ONU that defines the plurality of transmission windows, to refrain from providing full power to the optical transmitter during a period of time between the end of the transmission window and the start of a next transmission window of the plurality of transmission windows, when the duration of time between the end of the transmission window and the start of the next transmission window is greater than a predetermined length.

10. The ONU of claim 9 wherein said controlling the supply of power to refrain from providing full power to the optical transmitter during a period of time between the end of the transmission window and the start of a next transmission window comprises controlling the supply of power to refrain from providing any power to the optical transmitter during a period of time between the end of the transmission window and the start of the next transmission window.

11. The ONU of claim 9, wherein the power controller is further configured to perform the operation of:
    if data ready to be transmitted from the ONU during one transmission window of the plurality of transmission windows satisfies a criterion:
        controlling the supply of power to refrain from providing full power to the optical transmitter during the one transmission window.

12. The ONU of claim 11 wherein the criterion is that the amount of the data ready to be transmitted is less than a predetermined value.

13. The ONU of claim 9 wherein the predetermined length is at least as great as a summation of a period of time required for the optical transmitter to wake-up and a period of time required for the optical transmitter to shut-down.

14. The ONU of claim 13 wherein the period of time required for the optical transmitter to wake-up is representative of the time between initially providing power to the optical transmitter and the laser being ready to begin transmitting the data, and wherein the period of time required for the optical transmitter to shut-down is representative of a minimum amount of time during which the power must be terminated before the power can again be provided to the optical transmitter.

15. The ONU of claim 9, wherein the power controller is further for:
    controlling the supply of power in accordance with the information to provide full power to a data processing block in the ONU during the transmission window;
    controlling the supply of power in accordance with the information to refrain from providing full power to the data processing block during a period of time between the end of the transmission window and the start of the next transmission window.

16. The ONU of claim 9 wherein the optical transmitter is a transmission portion of an optical transceiver in the ONU, and wherein the optical receiver is a receiving portion of the optical transceiver.

17. A computer readable medium having stored thereon computer readable instructions for performing a method of power control in an Optical Network Unit (ONU), the computer readable instructions including instructions for performing operations comprising:
    receiving at least one message at the ONU, the at least one message comprising information defining a plurality of transmission windows during which data can be transmitted from the ONU;
    controlling a supply of power, in accordance with the information from the at least one message received at the ONU that defines the plurality of transmission windows, to provide power to an optical transmitter in the ONU beginning at a predetermined time in advance of a transmission window of the plurality of transmission windows to ensure a laser in the optical transmitter is ready to begin transmitting the data at the start of the transmission window;
    controlling the supply of power, in accordance with the information from the at least one message received at the ONU that defines the plurality of transmission windows, to refrain from providing full power to the optical transmitter during a period of time between the end of the transmission window and the start of a next transmission window of the plurality of transmission windows, when the duration of time between the end of the transmission window and the start of the next transmission window is greater than a predetermined length.

18. The computer readable medium of claim 17, wherein said controlling the supply of power to refrain from providing full power to the optical transmitter during a period of time between the end of the transmission window and the start of a next transmission window comprises controlling the supply of power to refrain from providing any power to the optical transmitter during a period of time between the end of the transmission window and the start of the next transmission window.

19. The computer readable medium of claim 17, wherein the computer readable instructions further include instructions for performing the operation of:
    if data ready to be transmitted from the ONU during one transmission window of the plurality of transmission windows satisfies a criterion:
        controlling the supply of power refrain from providing full power to the optical transmitter during the one transmission window.

20. The computer readable medium of claim 19 wherein the criterion is that the amount of the data ready to be transmitted is less than a predetermined value.

21. The computer readable medium of claim 17 wherein the predetermined length is at least as great as a summation of a period of time required for the optical transmitter to wake-up and a period of time required for the optical transmitter to shut-down.

22. The computer readable medium of claim 21 wherein the period of time required for the optical transmitter to wake-up is representative of the time between initially providing power to the optical transmitter and the laser being ready to begin transmitting the data, and wherein the period of time required for the optical transmitter to shut-down is representative of a minimum amount of time during which the power must be terminated before the power can again be provided to the optical transmitter.

23. The computer readable medium of claim 17, wherein the computer readable instructions further include instructions for performing operations comprising:
    controlling the supply of power in accordance with the information to provide full power to a data processing block in the ONU during the transmission window;
    controlling the supply of power in accordance with the information to refrain from providing full power to the data processing block during a period of time between the end of the transmission window and the start of the next transmission window.

24. The computer readable medium of claim 17 wherein the optical transmitter is a transmission portion of an optical transceiver in the ONU.

25. A Passive Optical Network (PON) comprising an Optical Line Terminator (OLT) in communication with a plurality of Optical Network Units (ONUs), wherein at least one ONU of the plurality of ONUs comprises:
    an optical transmitter having a laser;
    an optical receiver for receiving at least one message at the ONU, the at least one message comprising information defining a plurality of transmission windows during which data can be transmitted from the ONU;

a power controller for:

controlling a supply of power, in accordance with the information from the at least one message received at the ONU that defines the plurality of transmission windows, to provide power to the optical transmitter beginning at a predetermined time in advance of a transmission window of the plurality of transmission windows to ensure the laser is ready to begin transmitting the data at the start of the transmission window;

controlling the supply of power, in accordance with the information from the at least one message received at the ONU that defines the plurality of transmission windows, to refrain from providing full power to the optical transmitter during a period of time between the end of the transmission window and the start of a next transmission window of the plurality of transmission windows, when the duration of time between the end of the transmission window and the start of the next transmission window is greater than a predetermined length.

26. A multipoint control protocol (MPCP) engine for use in an Optical Network Unit (ONU), the MPCP engine for:

receiving at least one message comprising information defining a plurality of transmission windows during which data can be transmitted from the ONU;

controlling a supply of power, in accordance with the information from the at least one message received at the ONU that defines the plurality of transmission windows, to provide power to an optical transmitter in the ONU beginning at a predetermined time in advance of a transmission window of the plurality of transmission windows to ensure a laser in the optical transmitter is ready to begin transmitting the data at the start of the transmission window;

controlling the supply of power, in accordance with the information from the at least one message received at the ONU that defines the plurality of transmission windows, to refrain from providing full power to the optical transmitter during a period of time between the end of the transmission window and the start of a next transmission window of the plurality of transmission windows, when the duration of time between the end of the transmission window and the start of the next transmission window is greater than a predetermined length.

27. An Optical Network Unit (ONU) comprising:

an optical transmitter having a laser;

an optical receiver for receiving at least one message at the ONU, the at least one message comprising information defining a plurality of transmission windows during which data can be transmitted from the ONU;

a supply of power;

means for controlling the supply of power, in accordance with the information from the at least one message received at the ONU that defines the plurality of transmission windows, to provide power to the optical transmitter beginning at a predetermined time in advance of a transmission window of the plurality of transmission windows to ensure the laser is ready to begin transmitting the data at the start of the transmission window; and means for controlling the supply of power, in accordance with the information from the at least one message received at the ONU that defines the plurality of transmission windows, to refrain from providing full power to the optical transmitter during a period of time between the end of the transmission window and the start of a next transmission window of the plurality of transmission windows, when the duration of time between the end of the transmission window and the start of the next transmission window is greater than a predetermined length.

* * * * *